July 1, 1930.  B. A. SCHMITT  1,769,860
MACHINE FOR REPAIRING RUNS IN HOSIERY
Filed July 16, 1928  5 Sheets-Sheet 1
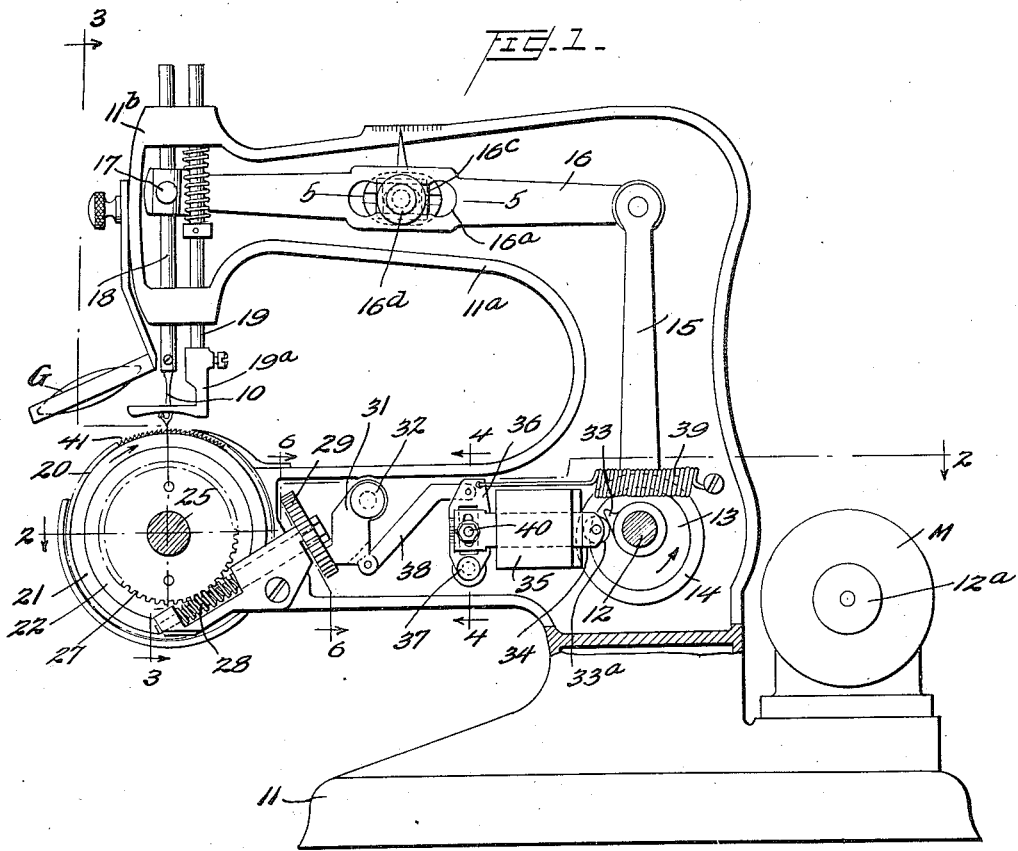
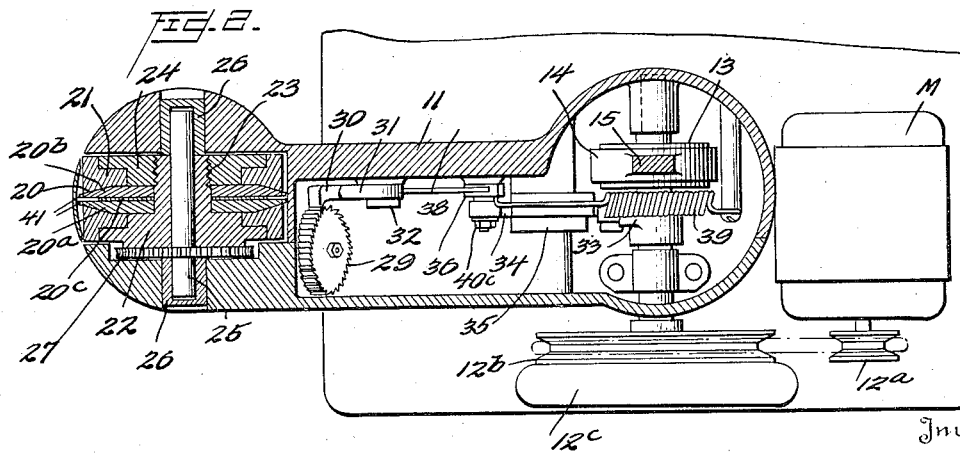
Inventor
B. A. Schmitt
By Watson, Coit, Morse & Grindle
Attorneys July 1, 1930. B. A. SCHMITT 1,769,860
MACHINE FOR REPAIRING RUNS IN HOSIERY
Filed July 16, 1928 5 Sheets-Sheet 2
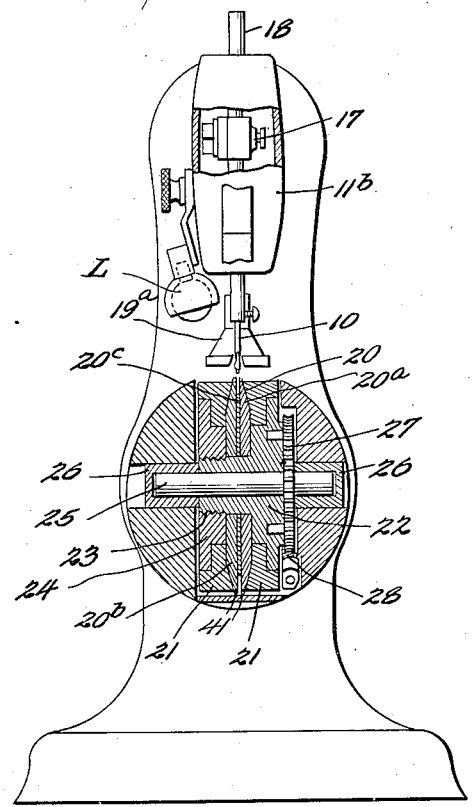
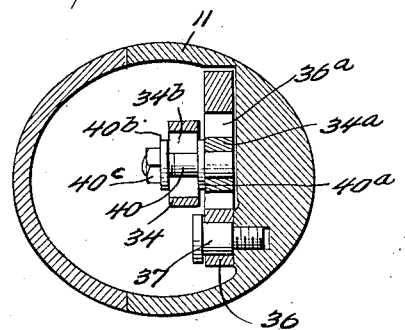
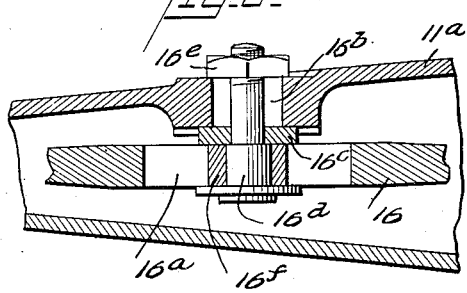
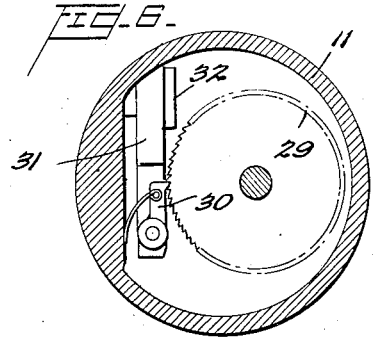
Inventor
B. A. Schmitt
By Watson, Coit, Morse & Grindle
Attorneys

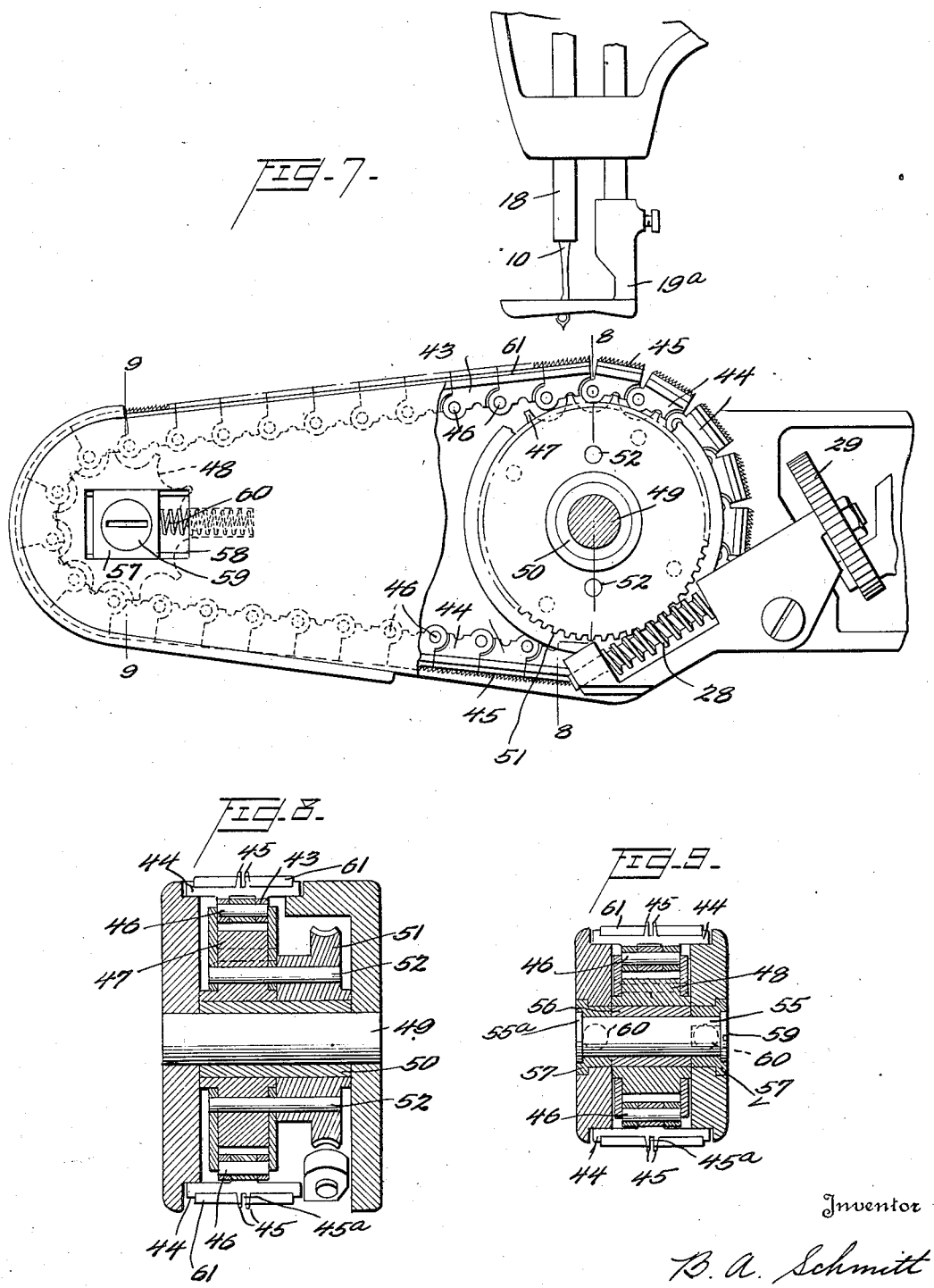

July 1, 1930. B. A. SCHMITT 1,769,860
MACHINE FOR REPAIRING RUNS IN HOSIERY
Filed July 16, 1928 5 Sheets-Sheet 4
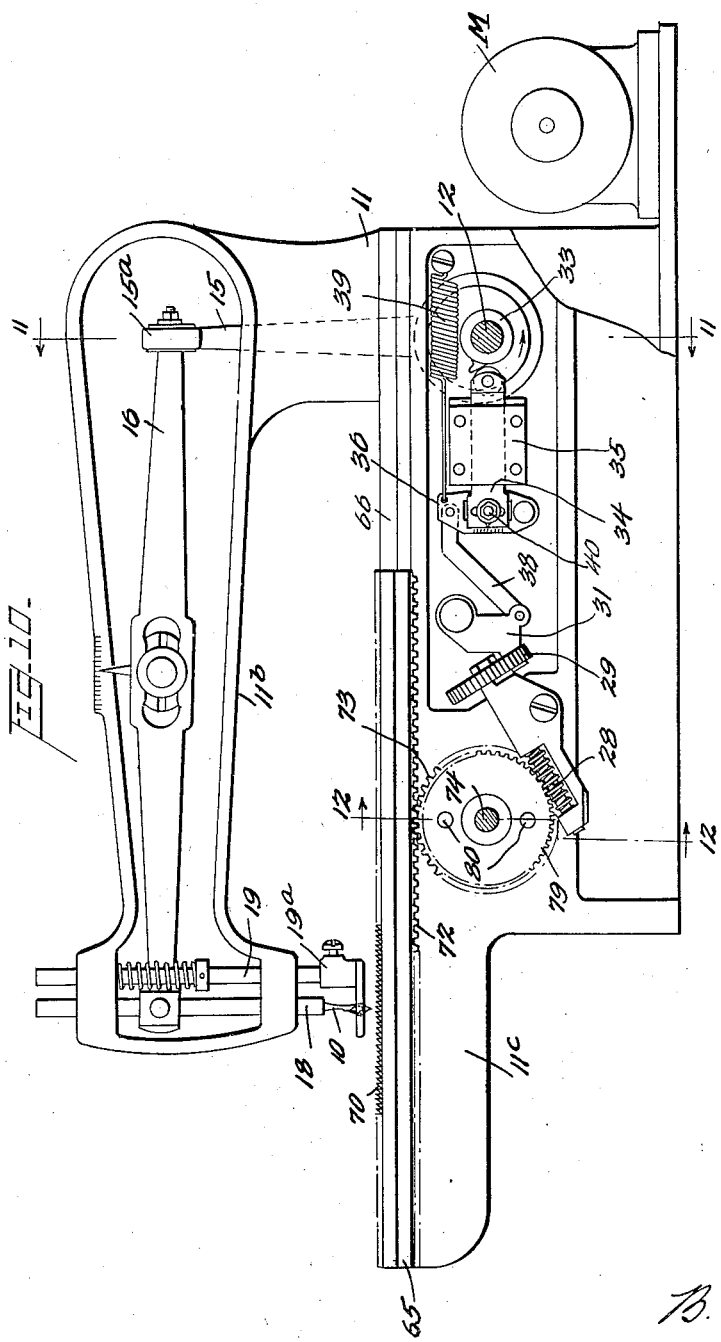
Inventor
B. A. Schmitt
By Watson, Coit, Morse & Grindle
Attorneys

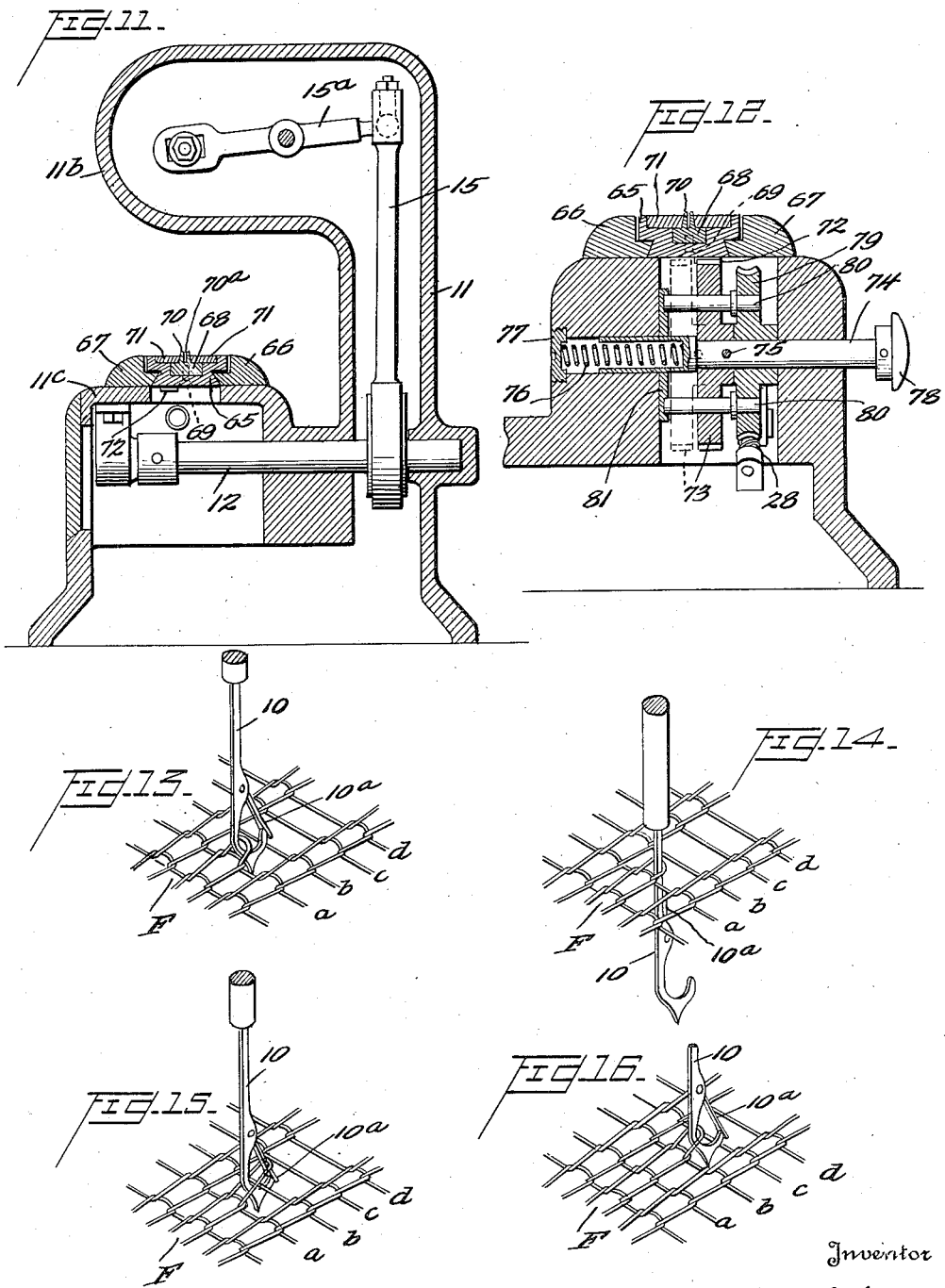

Patented July 1, 1930

1,769,860

UNITED STATES PATENT OFFICE

BERNARD A. SCHMITT, OF BROOKLYN, NEW YORK, ASSIGNOR, BY MESNE ASSIGNMENTS, TO GOTHAM KNITBAC MACHINE CORPORATION, A CORPORATION OF DELAWARE

MACHINE FOR REPAIRING RUNS IN HOSIERY

Application filed July 16, 1928. Serial No. 292,934.

This invention relates to a machine for repairing "runs" in knitted fabrics, particularly hosiery. Heretofore, so far as I am aware, work of this kind has been performed by hand, the operator using a special form of needle by which each transverse thread in a "run" can be formed into a loop with the loop of one thread hooked over the loop of the succeeding thread, which serves to restore the fabric substantially to its original condition.

The object of the present invention is to provide a machine by which the transverse threads of a "run" may be successively formed into loops and with each loop hooked over the next succeeding loop.

A further object of the invention is to provide a machine of this kind having a feed mechanism which is adapted to feed the fabric past a needle and during such feeding operation to perform the steps of forming the inter-engaging loops.

Another object is to provide a machine having a feed device which will move or feed the fabric by engagement with the threads extending across a "run", this being accomplished by providing the feed device with teeth so arranged that each tooth will engage one of the threads of a "run".

A further object is to provide a machine of this kind having feed mechanism in which the feeding device is given a step by step motion and caused to move one step during a reciprocation of the needle.

A further object is to provide a machine having a feeding device in combination with a reciprocating needle, the feeding device being provided with a slot into which the needle may extend as it passes downwardly through the fabric.

Numerous other advantages of the mechanism will be apparent from the following specification taken in connection with the accompanying drawings, in which several forms of the invention are illustrated, it being understood that other arrangements may be designed for carrying out the objects and purposes of the invention.

In said drawings:

Figure 1 is a longitudinal side elevation partly in section showing one embodiment of the invention;

Figure 2 is a longitudinal section on the line 2—2 of Fig. 1;

Figure 3 is a transverse section on line 3—3 of Fig. 1, parts being shown in elevation;

Figure 4 is a section on the line 4—4 of Fig. 1;

Figure 5 is a section on the line 5—5 of Fig. 1;

Figure 6 is a section substantially on the broken line 6—6 of Fig. 1;

Figure 7 is a longitudinal view partly in section showing a modified arrangement relating particularly to the feeding mechanism;

Figure 8 is a section substantially on the line 8—8 of Fig. 7;

Figure 9 is a section substantially on the line 9—9 of Fig. 7;

Figure 10 is a longitudinal view of a further modified form of the invention;

Figure 11 is a section substantially on the line 11—11 of Fig. 10;

Figure 12 is a section substantially on the line 12—12 of Fig. 10;

Figure 13 is a greatly enlarged perspective view of the needle and a section of fabric having a "run" therein, with the needle engaging a loop of one of the threads extending transversely of the "run";

Figure 14 is a view similar to Fig. 13, showing the needle at the downward limit of its movement;

Figure 15 is a similar view showing the needle after it has moved upwardly and hooked over the next succeeding thread in the run; and Figure 16 is a similar view showing the needle after a loop has been formed in the second run and substantially at the upper limit of its movement.

Referring briefly to the operations which the invention is designed to carry out and particularly to Figures 13 to 16 inclusive, the needle 10 is first shown as engaged with a loop in the thread $a$ forming part of the fabric F. Beyond this loop are shown several threads $b$, $c$, $d$ in which the loops have been dropped, or in other words, a "run" has formed. As the needle moves downwardly from the position shown in Figure 13, the loop in thread $a$ will slide up the shank of the needle and cause the latch $10^a$ thereof to be turned into an upright position as shown in Figure 14. When the needle is drawn upwardly from the position shown in Figure 14 to the position shown in Figure 15, the hook of the needle will engage the next thread $b$ and at the same time the latch $10^a$ will move downwardly and the loop in the thread $a$ will slip over the eye of the needle or, in other words, will be cast. As the needle continues to rise from the position shown in Figure 15, the thread $b$ will be drawn up into the form of a loop, as illustrated particularly in Figure 16. This operation continues until all of the threads extending transversely of the "run" have been provided with a loop, with the loop of each thread hooked over the loop of the succeeding thread. The parts of the machine are so timed that the fabric is moved or fed intermittently, such feed movements taking place when the needle is elevated.

The form of machine illustrated in Figures 1 to 6 inclusive comprises a frame or casing 11 having an upwardly and forwardly projecting arm $11^a$. Extending transversely of this casing is the main shaft 12 of the machine which may if desired be driven from a motor M through belt wheels $12^a$ and $12^b$ secured respectively to the motor shaft and the shaft 12. A hand wheel $12^c$ is provided for manually moving the shaft 12 if desired. The main shaft 12 carries an eccentric 13 secured thereto, the eccentric being surrounded by a strap 14 which is rigidly connected to an upwardly extending arm 15 pivoted to a rocker arm 16 fulcrumed on the frame, the other end of this rocker arm being pivotally connected at 17 in any suitable manner to the needle bar 18.

The fulcrum of the rocker arm 16 is made adjustable, as illustrated particularly in Figure 5. The arm 16 is slotted as shown at $16^a$ and the arm $11^a$ of the frame is likewise slotted as shown at $16^b$. A block $16^c$ is slidably supported on the frame and a bolt $16^d$ extends through the arm 16, the block $16^c$ and the part $11^a$ and this bolt is engaged by a nut $16^e$. A bushing $16^f$ surrounds the outer enlarged portion of the bolt $16^d$ and this bolt is provided with a shoulder which engages the block $16^c$. As is evident, this construction provides a means by which the fulcrum of the arm 16 may be accurately adjusted longitudinally.

The arm $11^a$ of the casing 11 terminates in a head $11^b$ in which the needle bar reciprocates and mounted in this head $11^b$ is also a slidable bar 19 which at its lower end carries a presser foot $19^a$ shaped and adapted to rest upon the fabric while it is fed past the needle, as later described.

In this form of machine the feed device comprises a feed wheel 20. This wheel preferably consists of two parts $20^a$, $20^b$ between which a disk $20^c$ is secured. The disk $20^c$ is somewhat smaller in diameter than parts $20^a$ and $20^b$, the result being that the feed wheel 20 viewed as a whole is slotted from its outer periphery inwardly. On each side of the wheel 20 is arranged a pad or support 21 on which the fabric is adapted to rest. This pad is preferably formed of a material such as rubber which will yield to pressure so that the fabric will have a somewhat yielding or cushion support as it passes beneath the needle.

The feed wheel 20 is mounted on the hub of a rotatable support 22, part of which is threaded as indicated at 23 to receive a circular member 24, the parts $20^a$, $20^b$ and $20^c$ of the wheel 20 being tightly clamped between the member 22 and the member 24. The member 22 is rotatably mounted on a shaft 25 which rotates in bushings 26 mounted in the frame 11 of the machine. Arranged adjacent the member 22 is a worm wheel 27 which is pinned or otherwise firmly secured to the member 22. It will be understood that the parts $20^a$, $20^b$, $20^c$, 21, 22, 24 and 27 rotate together since they are firmly connected and move as a single part.

The worm wheel 27 is operated by means of a worm 28 suitably supported in the frame of the machine and operated from a ratchet wheel 29 which is engaged and rotated by a ratchet 30 carried by a rocking arm 31 pivoted at 32 to the machine frame. The ratchet 30 is normally held against the wheel 29 and as the same is reciprocated by the arm 31 it is evident that the wheel 29 will be given an intermittent motion, which motion will be transmitted through the worm wheel 27 and thence to the feed wheel 20.

Reciprocation of the arm 31 is accomplished through the medium of a cam 33 secured to the shaft 12 and arranged to engage a wheel $33^a$ on one end of a slide 34. The slide 34 operates through a guide 35 and at its opposite end it is pivotally connected to a rocking arm 36 journaled at its lower end on the frame 11 by means of a bolt 37 threaded into the frame. At its upper end the arm 36 is connected to a link 38, the other end of said link being connected to the rocking arm 31 heretofore mentioned. A coiled spring 39 is secured at one end to the frame and the other end thereof engages the upper end of the rocking arm 36 whereby said slide 34 is yieldingly held at all times against the cam 33.

The slide 34 is adjustably connected to the arm 36. Such adjustment is provided by means of a slot $36^a$ formed in the arm 36 in which a block 34ª is mounted and which can be adjusted up and down in the slot. The arm 34 is also provided with a vertical slot 34ᵇ. A pin 40 is rotatably mounted in an opening in the block 34ª and is provided with a flange 40ª which spans the slot 34ᵇ. The outer end of the pin 40 is threaded and a washer 40ᵇ surrounds the same and also spans the slot 34ᵇ, a nut 40ᶜ being threaded on the outer end of the pin. By loosening the nut 40ᶜ the block 34ª may be moved toward or from the bolt 37 on which the arm 36 is pivoted and consequently the throw of the arm can be slightly varied as desired. By this arrangement the throw of the arms 36 and 31 may be adjusted to thereby accurately adjust the throw of the ratchet 30.

Referring briefly to the operation of the machine as thus far described, it will be apparent that as the shaft 12 is rotated, the rocker arm 16 will be rocked and the needle bar 18 and needle 10 will be reciprocated. The fulcrum of the arm 16 can be adjusted to accurately adjust the movements of the needle. As the shaft 12 is rotated, the cam 33 secured thereto will cause reciprocation of the slide 34 which in turn will rock the arm 31 to move the ratchet 30 over the ratchet wheel 29 and rotate the latter step by step. The intermittent rotation of this wheel through the worm 28 causes rotation of the worm wheel 27 which in turn causes step by step rotation of the feed wheel 20 in the direction shown by the arrow in Figure 1. The periphery of the feed wheel 20 throughout its circumference is provided with teeth 41, half of each tooth being on the part 20ª and the other half on the part 20ᵇ. The teeth 41 are spaced apart circumferentially of the wheel a distance substantially equal to the distance between the transverse threads of a "run," particularly when the fabric is slightly stretched in the direction of the "run." In other words, by slightly stretching the fabric, it can be laid over the wheel with a tooth thereof engaging each of the threads of the "run." The teeth 41 will therefore cause feeding of the fabric beneath the needle as the wheel is rotated. The parts are so timed that after the needle has hooked over one of the threads in the run and drawn the same upwardly to form a loop, the fabric will be fed beneath the needle a distance substantially equal to the space between the teeth so that after the needle descends and is again raised the hook will engage the next succeeding thread to form a loop therein and pull it through the previous loop, which latter is cast off the needle as the new loop is being formed.

In Figures 7, 8 and 9, a modified form of feeding device is illustrated, the rest of the machine being substantially the same as that heretofore described. In this form the feed device is made up of an endless chain 43 having links 44 which are adapted to be moved beneath the needle, each of these links being provided on its upper face with a plurality of teeth 45 spaced longitudinally of the links, the distance between them being equal to the distance between the threads of a "run" when the fabric is slightly stretched. In other words, the teeth on the links 44 are substantially of the same type as those previously described in connection with the feed wheel 20 in the other form of machine. The various links 44 are secured together by pivot pins 46 to form the continuous chain. This chain passes over a front sprocket wheel 47 and a rear sprocket wheel 48. The front sprocket wheel 47 is mounted substantially beneath the needle 10 and on a shaft 49 which is surrounded by a bushing 50 on which the sprocket wheel rotates. Arranged concentric with and secured to the sprocket wheel 47 is a worm wheel 51 and a plurality of pins 52 are rigidly secured in this worm wheel and extend through openings in the sprocket wheel, these pins serving to secure the sprocket wheel 47 and worm wheel 51 together. The worm wheel 51 is driven by means of a worm 28 which is the same as the corresponding worm wheel in the form of machine above described, this worm being driven by means of a ratchet wheel 29, as previously pointed out.

The rear sprocket wheel 48 is mounted on a shaft 55 surrounded by a bushing 56 on which the sprocket wheel rotates. Each end of the shaft 55 is supported in a block 57, which blocks are adapted to slide in slots 58 in the frame. At one end the shaft 55 is headed as shown at 55ª to engage a ledge on one of the blocks 57. At its other end the shaft 55 has a threaded socket into which a headed screw 59 is inserted and which engages the block 57. The front end of each of the blocks 57 is engaged by a coiled spring 60 which are mounted in suitable sockets in the frame. These springs therefore serve to exert a constant pressure on the sprocket chain to hold the same taut. As previously noted, each link 44 of the sprocket chain is provided with upwardly projecting teeth 45 and between these teeth a slot 45ª is formed to accommodate the needle as previously pointed out. Also, on each side of the teeth of each link there is provided a support or pad 61 of yieldable material such as rubber upon which the fabric is adapted to rest as it is being fed through the machine. The presser foot 19ª is adapted to rest on top of the endless chain as the material is being fed thereby and the lower surface of the presser foot is shaped to fit the surface of the endless chain upon which it rests when the machine is in operation. It is sufficient to say that the chain 43 is given an intermittent feed motion by the means described in connection with the first form of machine. The feed motions of the chain alternate with the reciprocation of the needle and the distance of each feed is substantially equal to the distance between the threads of a "run" slightly stretched. The needle 10 is so located relative to the sprocket wheel 47 that the needle cooperates with the links before they reach the top of the sprocket wheel and begin to tip over.

The operation of this form of device is substantially identical with that of the form previously described and a detailed description of the same is unnecessary.

Another form of machine embodying the generic invention is illustrated in Figures 10, 11 and 12. This form is also similar in many respects to that first described, although differing in certain details. In this form, the frame 11 is somewhat modified in shape and is provided with an arm 11$^b$ which extends laterally to overlie a platform portion 11$^c$ provided on the frame. Also, in this form of device the main shaft 12 operates the arm 15 as previously described, but this arm in turn operates a rocking arm 15$^a$ pivoted to the frame intermediate its length and engaging at its opposite end the main rock arm 16 which is constructed as heretofore described, this rock arm 16 operating the needle bar 18 and the needle 10.

This form of device differs from that first described mainly in the construction of the feed device. This feed device comprises a feed bar 65 which extends longitudinally beneath the needle 10 and beneath the overhanging portion 11$^b$ of the frame. The bar 65 is held in place by means of guide bars 66 and 67 which are secured to the platform portion 11$^c$ of the frame. The lower or under side of the bar 65 is made dovetailed and the bars 66, 67 are similarly shaped to provide a dovetailed guideway for the lower portion of the bar 65. The bar 65 is provided on its upper surface with a longitudinal groove in which a toothed bar 68 is mounted, being secured in position by means of screws 69 extending upwardly through the bottom portion of the bar 65. The teeth 70 on the upper side of the bar 65 are constructed substantially the same as the teeth on the feed wheel 20 and the links 44 heretofore described. In other words, the teeth on this bar are spaced apart longitudinally of the bar a distance substantially equal to the distance between the threads of a run when the same is slightly stretched, so that each tooth will engage a transverse thread in a "run". Also a slot 70$^a$ extends longitudinally of the bar to receive the needle 10 as it is reciprocated. On each side of the teeth 70 there is arranged a pad or support 71 of yieldable material such as rubber upon which the fabric is adapted to rest as it is fed beneath the needle. In this form of device the presser foot 19$^a$ is also adapted to rest upon the pads 71 as the material is fed by the movements of the bar. Beneath the bar 65 and extending longitudinally thereof is a rack 72 which is engaged by a gear wheel 73 mounted on a shaft 74 journaled in the casing. The shaft 74 is slidable longitudinally in its support and is pinned to the wheel 73 as indicated at 75. At one end the shaft 74 is provided with a pocket or recess in which a coiled spring 76 is mounted, the outer end of this spring engaging a plug 77 threaded into the casing. The spring 76 exerts a pressure upon the shaft 74 and normally forces it toward the right with the teeth of the gear 73 in mesh with the rack 72. The right hand end, Figure 12, of the shaft projects through the frame or casing and is provided with a knob 78. It will be apparent that by pressing inwardly upon the knob 78 the shaft 74 may be moved longitudinally which in turn will cause lateral movement of the gear 73 and disengagement of the same from the rack 72.

Arranged in the casing adjacent the gear 73 is a worm wheel 79 in which a plurality of pins 80 are firmly secured. These pins extend laterally through the gear wheel 73 and also engage rotating plate 81. As will be evident, this arrangement permits lateral shifting of the gear 73 while at the same time this gear is forced to rotate in unison with the worm wheel 79. The worm wheel 79 is engaged by a worm 28 identical with that heretofore described, this worm being driven by a ratchet wheel 29 and other mechanism identical with that shown and described in connection with the first form of machine.

Briefly referring to this modification of the invention, it will be seen that as the main shaft 12 is rotated, the needle will be reciprocated and simultaneously therewith the fabric will be fed beneath the needle. The parts are so timed that the needle will be given one reciprocation for each movement of the feed bar 65, this bar being moved intermittently as heretofore described in connection with the feed wheel 20 and the links 44 of the chain 43. As in the case of the other forms, the reciprocation of the needle and the intermittent movement of the feed bar 65 are so timed that the feed of the fabric and the operation of the needle will take place at proper intervals.

The threads in hosiery are very fine, and the needle is also very small so that it is difficult for the operator to see the same with the naked eye. In order to assist in this matter, a magnifying glass G (Fig. 1) may be attached to the arm of the machine above the point at which the needle operates. This enables the operations to be easily observed. Also a light L may be attached to the front end of the arm 11ª to illuminate the area around the needle and the feed mechanism to assist in observing the operations.

It is, of course, apparent that various modifications may be made in the details heretofore described, and it is to be understood that the invention is not restricted to such details except as pointed out in the appended claims.

Having thus described the invention, what is claimed as new and desired to be secured by Letters Patent is:

1. A machine for mending runs in knitted fabrics such as hosiery comprising, in combination, a reciprocating needle adapted to successively form loops in the transverse threads of a run with each loop hooked over the following loop, means for reciprocating said needle, and means for intermittently feeding the fabric past said needle, said feeding means including a device having teeth ending in the same plane for engaging the threads in a run, said teeth being spaced such distance as to permit each tooth to engage one of the transverse threads in a run.

2. A machine for mending runs in knitted fabrics such as hosiery comprising, in combination, a reciprocating needle adapted to successively form loops in the transverse threads of a run with each loop hooked over the following loop, a device for feeding the fabric past said needle, said device having a succession of teeth thereon in the same plane and spaced to permit each tooth to engage one of the transverse threads in a run, means for intermittently moving said feeding device a distance substantially equal to the distance between said teeth, and means for reciprocating said needle in timed relation with the movements of said device.

3. A machine for mending runs in knitted fabrics such as hosiery, comprising, in combination, a reciprocating needle adapted to successively form loops in the transverse threads of a run and pull each loop through a previous loop, a feeding device for feeding the fabric past said needle, said device having a succession of spaced teeth projecting upwardly therefrom and ending in substantially the same plane, each tooth being adapted to engage a transverse thread in a run, means for intermittently moving said teeth to move the threads in position to be engaged by said needle, and means reciprocating said needle.

4. A machine for mending runs in knitted fabrics such as hosiery, comprising, in combination, a reciprocating needle adapted to hook over each transverse thread of a run and pull the same through a loop formed in a previous thread, a feed bar having teeth spaced to engage each thread of a run, means for intermittently moving said bar to feed the fabric past said needle, and means for reciprocating said needle after each feeding movement of said bar.

5. A machine for mending runs in knitted fabrics such as hosiery, comprising, in combination, a reciprocating needle adapted to successively form loops in the transverse threads of a run and pull each loop through a previous loop, means for reciprocating said needle, a feed plate having teeth thereon and a padded support for the fabric on each side of the teeth, said teeth being spaced apart so that each tooth may engage a transverse thread in a run, and means for intermittently moving said feed plate in timed relation with the reciprocation of said needle.

6. A machine for mending runs in knitted fabrics such as hosiery, comprising, in combination, a reciprocating needle adapted to successively form loops in the transverse threads of a run and pull each loop through a previous loop, a feed device arranged beneath said needle and having teeth thereon for holding the transverse threads of a run in spaced relation and in substantially the same plane, said feed device having a slot to receive the lower end of the needle as it moves downwardly, means for intermittently moving said feed device past said needle, and means for reciprocating said needle.

7. A machine for mending runs in knitted fabrics such as hosiery, comprising, in combination, a reciprocating needle adapted to successively form loops in the transverse threads of a run and pull each loop through a previous loop, a feed device in the form of a bar having spaced teeth on the periphery thereof adapted to engage the threads of a run and move the same past said needle, means for intermittently moving said bar and means for reciprocating said needle.

In testimony whereof I hereunto affix my signature.

BERNARD A. SCHMITT.